United States Patent
Wlassics et al.

(10) Patent No.: US 7,217,742 B2
(45) Date of Patent: May 15, 2007

(54) SULPHONIC FLUORINATED IONOMERS

(75) Inventors: Ivan Wlassics, Genoa (IT); Vito Tortelli, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 168 days.

(21) Appl. No.: 11/142,186

(22) Filed: Jun. 2, 2005

(65) Prior Publication Data
US 2005/0228061 A1    Oct. 13, 2005

Related U.S. Application Data

(62) Division of application No. 10/768,690, filed on Feb. 2, 2004, now Pat. No. 6,979,699, which is a division of application No. 09/922,741, filed on Aug. 7, 2001, now Pat. No. 6,706,834.

(30) Foreign Application Priority Data

Aug. 8, 2000   (IT)   ............... MI2000A1843

(51) Int. Cl.
*C08J 5/20*   (2006.01)

(52) U.S. Cl. .......... 521/27; 526/243; 526/247; 526/250; 526/252

(58) Field of Classification Search ............ 521/27; 526/243, 247, 250, 252
See application file for complete search history.

(56) References Cited

U.S. PATENT DOCUMENTS

| | | | |
|---|---|---|---|
| 3,847,978 A | 11/1974 | Sianesi et al. | |
| 3,852,135 A | 12/1974 | Cook, Jr. et al. | |
| 4,789,717 A | 12/1988 | Giannetti et al. | |
| 4,864,006 A | 9/1989 | Giannetti et al. | |
| 4,940,525 A | 7/1990 | Ezzell et al. | |
| 5,281,680 A | 1/1994 | Grot | |
| 5,488,181 A | 1/1996 | Marchionni et al. | |
| 5,902,857 A | 5/1999 | Wlassics et al. | |
| 5,948,868 A | 9/1999 | Albano et al. | |

FOREIGN PATENT DOCUMENTS

| | | |
|---|---|---|
| EP | 0 131 308 A1 | 1/1985 |
| EP | 0 302 513 A1 | 2/1989 |
| EP | 0 769 520 A1 | 4/1997 |
| EP | 0 784 064 A1 | 7/1997 |
| EP | 0 842 980 A2 | 5/1998 |

OTHER PUBLICATIONS

Database WPI Section Ch, Week 197817, Derwent Publications Ltd., London, GB, AN 1978-31300A, XP-002184196.

*Primary Examiner*—Bernard Lipman
(74) *Attorney, Agent, or Firm*—Arent Fox LLP

(57) ABSTRACT

Sulphonic fluorinated ionomers crosslinked by radical crosslinking of:
A) crosslinkable sulphonic fluorinated ionomers, having equivalent weight 380–1300 g/eq and comprising: from 48% to 85% by moles of monomeric units deriving from tetrafluoroethylene (TFE);
from 15% to 47% by moles of fluorinated monomeric units containing sulphonyl groups —$SO_2F$; from 0.01% to 5% by moles of monomeric units deriving from a bis-olefin of formula:

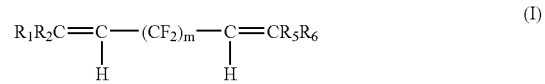

wherein: m=2–10, preferably 4–8; $R_1$, $R_2$, $R_5$, $R_6$, equal to or different from each other, are H or $C_1$–$C_5$ alkyl groups;
B) a fluorinated compound as crosslinking radical initiator;
C) a fluorinated bis-olefin of structure (I) as crosslinking agent;
the radical crosslinking being carried out at a temperature in the range 250° C.–310° C., preferably 260° C.–300° C.

16 Claims, No Drawings

SULPHONIC FLUORINATED IONOMERS

This is a Division of application Ser. No. 10/768,690 filed Feb. 2, 2004 now U.S. Pat. No. 6,979,699, which is a Division of application Ser. No. 09/922,741 filed Aug. 7, 2001 now U.S. Pat. No. 6,706,834. The disclosure of the prior applications are hereby incorporated by reference herein in their entirety.

The present invention relates to sulphonic fluorinated ionomers crosslinked by radical route suitable for the preparation of membranes for electrochemical applications, in particular for fuel cells, and as ionic exchange resins acting as catalysts.

Specifically, the invention relates to sulphonic fluorinated ionomers crosslinked by radical route characterized by a high hydration degree, both at room temperature and at high temperature (up to 180° C.), without substantially compromising the physical integrity of the obtained membranes, wherefore they are usable also at high temperatures in the range of 120° C.–180° C.

It is known in the prior art the use of the class of polymers called by the term "ionomers" in electrochemical applications, such for example in fuel cells, chlorosoda cells, lithium batteries and in reactors in which the ionomer acts as a solid catalyst. These applications implies the contact of the ionomer with a liquid, in particular water, having affinity with the ionic functional groups of the ionomer itself.

Generally, the larger the amount of ionic groups present in the chain, the better the efficiency of the ionomer application, both in terms of capability of ionic exchange in electrochemical applications, and in terms of catalyst activity in catalysis applications. From this point of view, an important parameter is the equivalent weight of this ionomer. The lower the equivalent weight, the higher the percentage of sulphonic groups present in the chain. Therefore, ionomers having a low equivalent weight are desirable since they give a higher application efficiency.

In electrochemical applications, for example in fuel cells, there is a direct correlation between the polymer conductivity and the water retention from the ionomer itself. The ionic conductivity of the polymer, besides being increased by the greater presence of ionic groups in the polymer, results increased, within an upper limit, also by the larger amount of water that the polymer is capable to retain (swelling degree). However, the excessive affinity of the ionomer with water has as a consequence the drawback of an excessive polymer swelling, which assumes a gelatinous state consequently losing its physical integrity. The ionomer becomes therefore completely unusable in all the applications wherein it is required under a solid form.

Also in the applications wherein the ionomer is mixed with or deposited on a support material, suitable to guarantee the shape and the physical integrity of the final membrane, the ionomer must however show a physical consistency sufficient to prevent the release thereof from the support and it must be insoluble in the liquid medium with which it comes into contact during the use.

Besides, the ionomeric membrane must be activated before the use, wherefore the chemical transformation of the precursor groups —$SO_2F$ into the corresponding sulphonic groups —$SO_3H$ is necessary. The membrane activation is carried out first by contacting it with an alkaline aqueous solution and then with an acid solution. During this transformation phase, if the ionomer has a high swelling degree, it can partially or completely dissolve in the reaction medium. At this point, it is impossible to recover the ionomer and separate it from the other products of the transformation reaction.

In the prior art, to obtain a limited ionomer hydration and sufficient physical integrity, polymers having a high equivalent weight, of the order of 1,000–1,200, are used i.e. having a low concentration of sulphonic groups, which represent the hydrophilic part of the polymer. Therefore, ionomers having a high equivalent weight absorb a limited amount of water, which guarantees the polymer insolubility. On the other hand, having few ionic groups, they have the drawback to give membranes having a lower ionic conductivity during the application. An example of said ionomers is represented by the commercial product NAFION®, used in fuel cells and having an equivalent weight of the order of 1,000–1,100. The membranes obtained from said ionomers have good mechanical properties. However, if these membranes are used at temperatures higher than 100° C., the interstitial water, which is the carrier of the protons $H^+$ in fuel cells, tends to reduce itself, wherefore the membrane tends to dehydrate and the membrane conductivity is drastically reduced. As a consequence, the membranes obtained by NAFION® are not efficiently usable at temperatures higher than 100° C.

U.S. Pat. No. 4,940,525 describes sulphonic ionomers having a low equivalent weight, lower than 725, used to obtain unsupported thick membranes for fuel cells, only if the hydration product of the polymer is low, lower than 22,000. So low hydration values are indeed necessary for maintaining the physical integrity of the ionomer having equivalent weights lower than 725, provided that the equivalent weight is not lower than 500 (col. 6, 8–16). Therefore, according to the description of this patent, it is impossible to obtain sulphonic ionomers of equivalent weight lower than 500 having the property of the insolubility in water. Besides, no mention is made to the behavior of the membranes at high temperatures, of the order of 120° C.–160° C.

The need was felt to have available sulphonic fluorinated ionomers such that the obtained membranes have a high hydration percentage, both at room temperture and at high temperature (up to about 180° C.) without substantially compromising the membrane physical integrity, wherefore the membranes are usable also at high temperatures, of the order of 120° C.–180° C., in electrochemical applications. Said membranes can be used also as ionic exchange resins.

An object of the present invention are therefore crosslinked sulphonic fluorinated ionomers obtainable by radical crosslinking of:
A) crosslinkable sulphonic fluorinated ionomers, having equivalent weight 380–1300 g/eq, preferably 380–800 g/eq, and comprising:
from 48% to 85% by moles of monomeric units deriving from tetrafluoroethylene (TFE);
from 15% to 47% by moles of fluorinated monomeric units containing sulphonyl groups —$SO_2F$;
from 0.01% to 5% by moles of monomeric units deriving from a bis-olefin of formula:

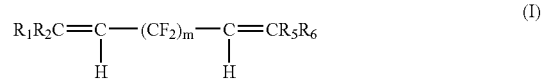

(I)

wherein: m=2–10, preferably 4–8;
$R_1$, $R_2$, $R_5$, $R_6$, equal to or different from each other, are H or $C_{1-C5}$ alkyl groups;

B) a fluorinated compound as crosslinking radical initiator;
C) a fluorinated bis-olefin of the above structure (I) as crosslinking agent;

the radical crosslinking being carried out at a temperature in the range 250° C.–310° C., preferably 260° C.–300° C.

Among the fluorinated monomers containing sulphonyl groups —SO$_2$F we can mention:

$F_2C$=CF—O—$CF_2$—$CF_2$—$SO_2$F;
$F_2C$=CF—O—[$CF_2$—CXF—O]$_{n'}$—$CF_2$—$CF_2$—$SO_2$F wherein X=Cl, F or $CF_3$; n'=1–10;
$F_2C$=CF—O—$CF_2$—$CF_2$—$CF_2$—$SO_2$F (vinylsulphonylfluoride);
$F_2C$=CF—Ar—$SO_2$F wherein Ar is an aryl ring.

Preferably the crosslinkable fluorinated sulphonic ionomers A) comprise:
from 54% to 71% by moles of monomeric units deriving from TFE;
from 45% to 28% by moles of monomeric units deriving from vinylsulphonylfluoride $F_2C$=CF—O—$CF_2$—$CF_2$—$SO_2$F;
an amount higher than 0.4% by moles up to 3% by moles, more preferably from 1% to 2.5% by moles of monomeric units deriving from the bis-olefin of formula (I).

As regards the radical initiators B) used in the radical crosslinking of the present invention, they are selected from:
(d) branched perfluoroalkanes of formula:

$C_aF_{2a+2}$ wherein a=5–15, preferably 7–11;

(e) halogenated compounds of formula:

$ClO_2S(CF_2)_nSO_2Cl$ wherein n=4–10;

(f) peroxidic perfluoropolyether compounds having oxidizing power in the range 0.8–6, preferably 1–3.5, of structure T—O—($R_f$)—(O)$_c$—T'
wherein:

T,T'=—$CF_3$, —$CF_2CF_3$, —$CF_2CF_2CF_3$ c is an integer such as to give the above oxidizing power;
$R_f$ perfluoropolyether chain having a number average molecular weight in the range 1,000 and 30,000, preferably 4,000–20,000, comprising one or more of the following units:

—($CF_2$O)—, —($CF_2CF_2$O)—, —($CF_2CF_2CF_2$O)—, —($C_3F_6$O)—

Preferably the perfluoropolyether chain $R_f$ is selected from the following structures:

—($CF_2$O)$_{a'}$($CF_2CF_2$O)$_{b'}$— with b'/a' in the range 0.1–40, preferably 0.5–20, a' and b' being integers such as to give the above molecular weight;

—($CF_2$O)$_{c'}$($C_3F_6$O)$_{d'}$— with c'/d' in the range 0.01–5, c' and d' being integers such to give the above molecular weight.

As oxidizing power it is meant the amount in grams of peroxidic oxygen per 100 grams of polymer.

As radical initiator, a peroxidic compound of formula (f) with the above oxidizing power is more preferably used. The preparation of the peroxidic initiators (f) can be carried out according to the processes described in U.S. Pat. Nos. 3,847,978 and 5,488,181.

It has been found by the Applicant that both in the case of too low oxidizing power and in the case of too high oxidizing power, the crosslinking of the ionomeric chains is poor. The Applicant has found that using as initiator the compound of formula (f) having an oxidizing power within the above values, a very good level of crosslinking is obtained.

When a radical initiator of formula (f) is used for the crosslinking, it is fed in a concentration in the range 2%–10% by weight, preferably 3–6% by weight with respect to the weight of the sulphonic ionomer.

As regards the crosslinking agent bis-olefin of formula (I), it is fed in a concentration in the range 3%–25% by weight, preferably 4–8% with respect to the weight of the sulphonic ionomer.

According to a not binding theory, the Applicant keeps that in the crosslinking initial phase, the radical initiator has the function to remove a proton from the bis-olefin of formula (I) present in the chain of the sulphonic ionomer. The so formed radical can attack the double bond of the bis-olefin c) introduced as crosslinking agent and generate the first part of the reticule. The repetition of this H* extraction event on another ionomeric chain allows the reticule formation.

A further object of the invention are the supported or self-supported membranes, and their process of preparation by using the crosslinked sulphonic fluorinated ionomers of the present invention.

For supported membranes, foamed PTFE, preferably bis-tretched, can be used as support, having a suitable dimension in connection with the electrochemical cell, having a thickness comprised between 10 μm and 50 μm. For the preparation of supported membranes, first a solution is prepared formed by:

A) a solution of the sulphonic ionomer in a fluorinated solvent selected from: hexafluoroxylene, perfluorohexane, perfluorooctane, perfluorobenzene, perfluoropolyether solvents, fluoroether solvents.
B) a radical initiator of formula (d), (e) or (f);
C) the bis-olefin of formula (I) as crosslinking agent.

The porous support of foamed PTFE is dipped in the solution formed by A)+B)+C) for a time comprised between 10 seconds and 1 minute; the impregnation is repeated more times until an impregnated membrane is obtained. Subsequently the ionomeric solution excess is removed from the support, for example by a roller system. The supported membrane obtained by impregnation is then dried at 25° C. for about 1 hour, to remove the fluorinated solvent.

At this point, the membrane is crosslinked at the above mentioned temperature, for a reaction time equal to 6 half-lives of the used initiator, i.e. until a decomposition of about 99% of the initiator. When a radical initiator of formula (f) is used, the crosslinking average time generally ranges from about 10 seconds to 3 minutes.

Alternatively, the preparation of the supported membrane can be carried out by casting. In the case of thick membrane (self-supported), the membrane can be obtained by casting or by press. In the latter case a film of the solution A)+B)+C) is placed between two metal plates containing a metal frame, which confers to the resulting membrane the desired thickness. Then, the plate/frame/film system is put in a press oven applying a weight of about 500–2,000 kg, preferably 750–1,500 Kg.

The supported or thick membranes, obtained from the sulphonic ionomers crosslinked by the method of the present invention have a thickness ranging from 10 μm to 300 μm depending on the used preparation method. The membrane appears transparent, in some cases light brown-coloured. The morphological analysis at the microscope of the obtained membrane shows a substantially uniform, smooth and completely free from holes surface.

The obtained membrane, when it appears light brown-coloured, can be decolorated. Decoloration can be carried out by dipping the membrane in the —SO$_2$F form into an aqueous solution containing H$_2$O$_2$ at 9% (weight/volume) and HNO$_3$ at 10% (weight/volume) at 50° C. for about 4–6 hours. A colourless and transparent membrane is obtained with a maximum weight loss lower than 1% by weight (colour loss higher than 95% by UV analysis). The decoloration treatment can be carried out both before and after the membrane activation treatment described hereunder.

The membrane is then subjected to the activation treatment for transforming the sulphonyl groups —SO$_2$F into sulphonic groups —SO$_3$H. The activation implies 2 steps:
  salification for transforming the —SO$_2$F form into the —SO$_3^-$ form;
  acidification for transforming the —SO$_3^-$ form into the —SO$_3$H form.

Salification is carried out by dipping the membrane obtained after the crosslinking reaction in a basic aqueous solution of KOH or of NaOH at a temperature such as to have an almost total conversion into the —SO$_3^-$ groups.

It has been found by the Applicant that, for equivalent weights lower than 800, a temperature in the range 5° C.–40° C., for a time comprised between 4 and 40 hours, can be used. The 97% of the conversion takes place in the first 20–30 minutes of reaction; further 5 hours are necessary for obtaining the required conversion of 99.9% (upper limit of instrumental detection). The weight loss due to the dissolving of the salified membrane in water is lower than 20%. Temperatures higher than 40° C., shorten the conversion times, but they remarkably increase the weight loss of the membrane (for example operating at 70° C., there is a weight loss equal to 90–95%). Therefore, the crosslinked membranes obtained from the sulphonic fluorinated ionomers having a low equivalent weight of the invention show the additional advantage to be salified at room temperature.

At the end of the salification, the membrane is dipped into a distilled water bath at 25° C. for washing the residual base.

The acidification is carried out by dipping the salified membrane in an aqueous solution containing the 20% by weight of HCl at 25° C. for 5 hours. The conversion is equal to 99.9% 20 with a weight loss of the membrane in the —SO$_3$H form lower than 1%. The resulting crosslinked, optionally decolorated, membrane in the —SO$_3$H form, is suitable to be used in applications of electrochemical type, for example of fuel cell type or in catalysis applications as ionic exchange resin.

The crosslinked membranes of the invention after activation, i.e. in the —SO$_3$H form, show the following propeties:
  amount of gels higher than 85%, generally higher than 90%;
  after drying and hydration in water at 100° C. for 30 minutes, the membrane substantially remains integer without dissolving in water.

As "gel" is meant the insoluble part of the polymer and the % by weight of gels is correlated with the crosslinking degree of the ionomer itself. Indicatively, the higher the % by weight of gels, the lower the amount of uncrosslinked ionomer.

Tests carried out by the Applicant (see the Examples) show that the obtained membranes, notwithstanding the high hydration percentage, have a good physical integrity and they are substantially insoluble in water both at low and at high temperature (up to about 180° C.). In particular, the T$_r$ values (interstitial water release temperature) obtained by thermogravimetric analysis TGA, result surprisingly high.

The interstitial water is the carrier of the H$^+$ protons in fuel cells, wherefore the invention membranes, having a T$_r$ in the range 160° C.–180° C., are capable to mantain a good conductivity also at very high temperatures, for example of the order of about 160° C. This is surprising and unexpected since the membranes of sulphonic ionomers known in the prior art are not usable in an efficient way at temperatures higher than 100° C.

Besides in the preparation of membranes for fuel cells, the sulphonic ionomers of the present invention can successfully be used in the preparation of ionic exchange resins for carrying out chemico-physical separations and as acid catalyst for chemical reactions. The crosslinked ionomer of the invention, when used as an acid catalyst, appears extremely effective since it allows to obtain high yields in short times.

As regards the preparation of crosslinkable sulphonic fluorinated ionomers, it can be carried out by polymerization in aqueous emulsion according to well known methods of the prior art, in the presence of radical initiators (for example, alkaline or ammonium persulphates, perphosphates, perborates or percarbonates), optionally in combination with ferrous, cupric or silver salts, or other easily oxidizable metals. In the reaction medium also surfactants of various type are usually present, among which the fluorinated surfactants of formula:

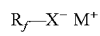

$$R_f\text{—}X^-\ M^+$$

are particularly preferred, wherein R$_f$ is a C$_{5-C16}$ (per)fluoroalkyl chain or a (per)fluoropolyoxyalkylene chain, X$^-$ is —COO$^-$ or —SO$_3^-$, M$^+$ is selected from: H$^+$, NH$_4^+$, alkaline metal ion. Among the most commonly used we remember: ammonium perfluoro-octanoate, (per) fluoropolyoxyalkylenes ended with one or more carboxylic groups, etc.

When the polymerization is over, the ionomer is isolated by conventional methods, such as coagulation by addition of electrolytes or by cooling.

Alternatively, the polymerization reaction can be carried out in bulk or in suspension, in an organic liquid wherein a suitable radical initiator is present, according to well known techniques.

The polymerization reaction is generally carried out at temperatures in the range 25°–150° C., under pressure up to 10 MPa.

The preparation of the sulphonic fluorinated ionomers of the invention is preferably carried out in aqueous emulsion in the presence of an emulsion, dispersion or microemulsion of perfluoropolyoxyalkylenes, according to U.S. Pat. No. 4,789,717 and U.S. Pat. No. 4,864,006.

The present invention will be now better illustrated by the following embodiment Examples, which have a merely indicative purpose but not limitative of the scope of the invention itself.

EXAMPLES

Characterization

Percentage of Gels

The "gel" term is defined as the insoluble part of a polymer in the same solvent wherein it was soluble before the crosslinking. The % of gels is therefore correlated with the crosslinking degree of the polymer itself.

The gel % is evaluated before and after the crosslinking by the following procedure:
the ionomer is solubilized in perfluorohexane with an ionomer/solvent concentration of about 25% (weight/volume);
the solution is left under stirring at 40° C. for 24 hours; at the end the % by weight of ionomer which is not dissolved is evaluated.

Percentage of Hydration

After drying (1 hour at 50° C.), the membrane is weighed and subsequently hydrated in distilled water at 100° C. for 30 minutes; then it is extracted from water, dried on the surface and weighed again.

The hydration percentage H% of the membrane is evaluated according to the following formula:

H%=100×(hydrated membrane weight−dried membrane weight/dried membrane weight)

Percentage of Extractable Substances

The dried membrane is first weighed and then put in a solution of ethanol/water 40/60 by weight at 50° C. for 22 hours. Subsequently the solution is filtered on filter Whatman 541. The filtered product is dried at 80° C. and the dry residue is weighed.

The percentage of extractable substances E% is calculated according to the following formula:

E%=100×(dry residue weight/membrane initial weight)

The lower the percentage of extractable E%, the higher the chemico-physical resistance of the obtained membrane.

Release Temperature of the Interstitial Water

The release temperature $T_r$ of the interstitial water is evaluated by thermogravimetric analysis (TGA).

An amount of about 10 mg of the membrane, hydrated in distilled water at 100° C. for 30 minutes, is analyzed in a thermogravimetric analyser Perkin Elmer model TGA7. After having been maintained in $N_2$ flow at room temperature, the sample is heated with a temperature gradient of 10° C./min up to 80° C., temperature at which it is maintained for 5 minutes. Subsequently the sample is cooled at the same rate until room temperature, at which it is maintained for 10 minutes. Then the thermogravimetric analysis starts by heating the sample at a rate of 10° C./min.

The TGA curve derivative allows to go back to the value of the release temperature $T_r$, in correspondence of the second minimum of the derivative of the TGA curve. The higher the temperature $T_r$, the greater the capability of the membrane to retain water and consequently to lead also to high temperatures.

Example 1

In a 2 litre autoclave, the following reactants are introduced:
700 ml of demineralized water;
45 ml of the monomer of formula $CF_2=CF-O-CF_2CF_2-SO_2F$;
29 g of a microemulsion of perfluoropolyoxyalkylenes previously obtained by mixing:
11.6 g of a perfluoropolyoxyalkylene having a potassium salified acid end group of formula:

$ClCF_2O(CF_2-CF(CF_3)O)_n(CF_2O)_mCF_2COOK$ wherein n/m=10 having number average molecular weight 527;

5.8 g of a perfluoropolyether oil Galden® D02 of formula $CF_3O(CF_2-CF(CF_3)O)_n(CF_2O)_mCF_3$
wherein n/m=20 having average molecular weight 450
11.6 g of water;
240 g of a bis-olefin of formula $CH_2=CH-(CF_2)_6-CH=CH_2$ fed in a Galden® D02 solvent obtaining a solution at 30% by volume of bis-olefin.

The autoclave, kept under stirring at 700 rpm, has been heated up to 50° C. 400 ml of an aqueous solution having a concentration of 20 g/l of potassium persulphate (KPS) are then fed into the autoclave. The pressure is brought to 3 absolute bar introducing TFE. The reaction starts after 3 min. The pressure is maintained at 3 absolute bar by feeding TFE.

The total mass of TFE fed to the reactor is equal to 760 g. The total mass of sulphonyl monomer $CF_2=CF-O-CF_2CF_2-SO_2F$ fed to the reactor is equal to 2,126 g.

The reaction is stopped after 280 min from the starting, lessening the stirring, cooling the reactor and venting the TFE. The produced latex has a solid content of 25% by weight. The latex is coagulated by freezing, the polymer is separated from the mother liquors and dried at 100° C. for 8 h at room pressure. The composition by moles of the copolymer determined by NMR results to be:
62.9% TFE, 35.1% sulphonic monomer, 2% bis-olefin. The equivalent weight results of 480 g/eq.

On a sample of sulphonic ionomer obtained from the polymerization, the gel % is evaluated according to the above procedure. A value of gels equal to 10% is obtained and the ionomer almost completely dissolves in solution.

Crosslinking 17.64 g of ionomer obtained by the above described polymerization are dissolved in 82.36 g of a perfluoropolyether solvent of formula $CF_3CF_2O-(C_3F_6O)_3-CF_2H$ obtaining an ionomeric solution having an ionomer concentration equal to 17.64% by weight.

To 100 g of the ionomeric solution:
5% by weight referred to the ionomer of the bis-olefin of formula $CH_2=CH-(CF_2)_6-CH=CH_2$;
4% by weight of an initiator having the formula:

$T-O-(R_f)-(O)_c-T'$ are added wherein: $T,T'=-CF_3$
c is an integer such to give an oxidizing power equal to 2;
$R_f$=perfluoropolyether chain having a number average molecular weight in the range 6,500–7,500, and structure:

$-(CF_2O)_{a'}(CF_2CF_2O)_{b'}-$ with b'/a' in the range 0.5 and 20, a' and b' being integers such as to give the above indicated molecular weight.

A mother solution containing sulphonic ionomer, bis-olefin and radical initiator is obtained.

85% of the solvent is evaporated under light nitrogen flow. The remaining 15% of the solvent is evaporated, leaving the mother solution under ventilation of an inert gas. An homogeneous film formed by ionomer, bis-olefin and radical initiator is thus obtained.

Crosslinking of the ionomeric film is carried out a temperature of 270° C. The reaction time is equal to 35 seconds. After crosslinking the percentage by weight of gels on the basis of the above procedure is evaluated. A gel value equal to 98% is obtained. The ionomer can then face the subsequent activation reaction for transforming the sulphonyl groups —SO$_2$F into sulphonic groups —SO$_3$H without substantial material loss.

Example 2

Example 1 is repeated with the difference that the used amount of bis-olefin of formula CH$_2$=CH—(CF$_2$)$_6$—CH=CH$_2$ is equal to 15% by weight with respect to the sulphonic ionomer. A mother solution containing sulphonic ionomer, bis-olefin and radical initiator is obtained.

85% of the solvent is evaporated under light nitrogen flow. The remaining 15% of the solvent is evaporated by leaving the mother solution under ventilation of an inert gas. An homogeneous film formed by ionomer, bis-olefin and radical initiator is thus obtained.

Crosslinking of the ionomeric film is carried out a temperature of 270° C. The reaction time is equal to 35 seconds.

After crosslinking a gel value equal to 96% is obtained.

Example 3

Example 1 is repeated but using the initiator of Example 1 in an amount equal to 3% by weight with respect to the ionomer. The crosslinking procedure of Example 1 is repeated.

After crosslinking according to the method of the present invention, a gel value equal to 90% is obtained.

Example 4

Example 1 is repeated, using an initiator having the same structure of that of Example 1, but with an oxidizing power equal to 3.5

The crosslinking temperature is equal to 290° C.

After crosslinking according to the method of the present invention, a gel value equal to 86% is obtained.

Example 5 (Comparative)

Example 1 is repeated, but carrying out the crosslinking at the temperature of 210° C.

After a reaction time equal to 30 minutes the percentage of gels is evaluated. A gel value equal to 10% is obtained. This Example shows that at the temperature of 210° C. the crosslinking reaction of the invention does not take place.

Example 6 (Comparative)

Examaple 1 is repeated with the difference that the used amount of bis-olefin of formula CH$_2$=CH—(CF$_2$)$_6$—CH=CH$_2$ is equal to 2% by weight with respect to the sulphonic ionomer.

The crosslinking procedure of Example 1 is repeated.

At the end of the crosslinking the gel % results equal to 60%.

This Example shows that when the % by weight of crosslnking agent (bis-olefin) is lower than the defined range, the crosslinking reaction of the invention only partially takes place.

Example 7 (Comparative)

Example 1 is repeated, using an initiator having the same structure of that of Example 1, but with an oxidizing power equal to 0.4, in an amount of 10% by weight with respect to the ionomer.

The crosslinking procedure of Example 1 is repeated.

The gel % results equal to 10%. This Example shows that when the oxidizing power of the initiator is lower than 0.8, the crosslinking reaction of the invention does not take place.

Example 8

Activation

The film obtained by the crosslinking carried out in Example 1 is subjected to a salification treatment for 6 hours at 25° C. in a KOH aqueous solution at 10% by weight. The 97% of the conversion takes place in the first 20–30 minutes of reaction; further 5 hours are instead necessary for obtaining the required conversion of 99.9% (upper limit of instrumental detection). The weight loss due to the dissolving of the salified membrane in water is equal to 14%.

At the end of the salification, the membrane is dipped into a distilled water bath at 25° C. for washing the residual KOH.

The acidification is carried out by placing the salified membrane in an aqueous solution containing the 20% by weight of HCl at 25° C. for 5 hours. The conversion is equal to 99.9% with a weight loss of the membrane in the —SO$_3$H form lower than 1%.

The previous treatment of salification and acidification involves the complete transformation, in the limits detectable at the FTIR analysis, of the —SO$_2$F groups into sulphonic groups —SO$_3$H.

This Example shows that the crosslinked film according to the method of the present invention can advantageously be salified at room temperature.

Example 9

A membrane is prepared by using as a support, bistretched foamed PTFE having thickness of 35 μm and porosity equal to 0.2 μm.

17.64 g of ionomer obtained by the polymerization of Example 1 are dissolved in 82.36 g of a perfluoropolyether solvent of formula CF$_3$CF$_2$O—(C$_3$F$_6$O)$_3$—CF$_2$H obtaining an ionomeric solution having an ionomer concentration equal to 17.64% by weight.

To 100 g of the ionomeric solution:
  5% by weight referred to the ionomer of the bis-olefin of Example 1;
  4% by weight of the radical initiator of Example 1; are added.

A mother solution containing sulphonic ionomer, bis-olefin and radical initiator is obtained. The porous support of foamed PTFE is dipped into this solution for 10 seconds; the impregnation is repeated 3 times, until a 100% impregnated membrane, completely transparent, having thickness of 110 μm, is obtained. Subsequently the ionomeric solution in excess is removed from the support by a roller system. The supported membrane obtained from the impregnation is then dried at 50° C. for about 1 hour, to eliminate the fluorinated solvent.

At this point, the membrane is crosslinked at the temperatue of 270° C. for a reaction time equal to 35 seconds. Then the membrane is activated in the —SO$_3$H form following the procedure described in Example 8. The weight loss % during the activation is equal to 12.6%.

A percentage of extractable substances E% equal to 2% is determined.

The percentage of hydration H% is equal to 40%.

The release temperature $T_r$ of the interstitial water is 175° C.

Example 10

A membrane is prepared following the same impregnation procedure of Example 9, but using as a support monostretched foamed PTFE having thickness of 60 μm and porosity equal to 0.45 μm.

As solvent for the ionomeric solution $CH_3OC_4F_9$ (HFE 7100) is used. Crosslinking takes place at the temperature of 270° C. for a reaction time equal to 35 seconds. After crosslinking, the membrane is activated in the —$SO_3H$ form following the procedure of Example 8.

The so obtained ionomeric membrane, having thickness of 65 μm, is dried for 1 h at 50° C.

The percentage of extractable substances E% is 20%.

The percentage of hydration H% is equal to 40%.

The release temperature $T_r$ of the interstitial water is 168° C.

Example 11

A non supported thick membrane is prepared by casting from solvent, using the same perfluoropolyether solvent of Example 9. Crosslinking takes place at the temperature of 270° C. for a reaction time equal to 35 seconds.

After crosslinking, the membrane is activated in the —$SO_3H$ form following the procedure of Example 8. The weight loss % during the activation is equal to 12.6%.

The so obtained ionomeric membrane, having thickness of 250 μm, is dried for 1 h at 50° C.

The percentage of extractable substances E% is 21%.

The percentage of hydration H% is equal to 55%.

The release temperature $T_r$ of the interstitial water is 161° C.

Example 12

A supported membrane is prepared using as a support bi-stretched foamed PTFE having thickness of 35 μm and porosity equal to 0.2 μm. The procedure by casting is used, using the same perfluoropolyether solvent of Example 9.

Crosslinking takes place at the temperature of 270° C. for a reaction time equal to 35 seconds. After crosslinking, the membrane is activated in the —$SO_3H$ form following the procedure of Example 8.

The so obtained ionomeric membrane, having thickness of 65 μm, is dried for 1 h at 50° C.

The percentage of extractable substances E% is 11%.

The percentage of hydration H% is equal to 92%.

The release temperature $T_r$ of the interstitial water is 164° C.

Example 13

In this Example the membrane obtained in Example 9 is used as acid catalyst in the Friedel-Craft acylation reaction. The Friedel-Craft reaction has been used as a test for evaluating the catalysis efficiency of the sulphonic groups present in the membrane.

The 3% by weight of the membrane in the —$SO_3H$ form of Example 9 is added to an equimolar mixture of the reactants anisole and acetic anhydride with respect to the anisole.

The reaction formation of the reaction product 4-inethoxyacetophenone, carried out at a temperature of 22° C., reaches a conversion of 95% in 25 minutes and it is completed with a conversion of 100% in 37 minutes.

This Example shows that the crosslinked sulphonic fluorinated ionomers by radical route of the invention can advantageously be used as acid catalyst for chemical reactions.

TABLE 1

|  | Crosslinking agent (%) | Initiator (%) | Initiator PO | Temperature (° C.) | Reaction time | Gels (%) |
|---|---|---|---|---|---|---|
| Example 1 | 5 | 4 | 2.0 | 270 | 35 seconds | 98 |
| Example 2 | 15 | 4 | 2.0 | 270 | 35 seconds | 96 |
| Example 3 | 5 | 3 | 2.0 | 270 | 35 seconds | 90 |
| Example 4 | 5 | 4 | 3.5 | 290 | 35 seconds | 86 |
| Example 5 Comp. | 5 | 4 | 2.0 | 210 | 30 minutes | 10 |
| Example 6 Comp. | 2 | 4 | 2.0 | 270 | 35 seconds | 60 |
| Example 7 Comp. | 5 | 15 | 0.4 | 270 | 35 seconds | 10 |

TABLE 2

|  | Support | Methodology | Membrane thickness (μm) | Extractable substances (%) | Hydration (%) | Tr (° C.) |
|---|---|---|---|---|---|---|
| Example 9 | bistretched foamed PTFE | impregnation | 110 | 2 | 40 | 175 |
| Example 10 | monostretched foamed PTFE | impregnation | 65 | 20 | 40 | 168 |
| Example 11 | — | casting | 250 | 21 | 55 | 161 |
| Example 12 | bistretched foamed PTFE | casting | 65 | 11 | 92 | 164 |

The invention claimed:

1. A process for preparing sulphonic fluorinated ionomers comprising radical crosslinking of:
   A) crosslinkable sulphonic fluorinated ionomers, having equivalent weight 380–1300 g/eq and comprising:
      from 48% to 85% by moles of monomeric units deriving from tetrafluoroethylene (TFE);
      from 15% to 47% by moles of fluorinated monomeric units containing sulphonyl groups —$SO_2F$;
      from 0.01% to 5% by moles of monomeric units deriving from a bis-olefin of formula:

$$R_1R_2C=C(H)-(CF_2)_m-C(H)=CR_5R_6 \quad (I)$$

wherein: m=2–10;
   $R_1, R_2, R_5, R_6$, equal to or different from each other, are H or $C_{1-C5}$ alkyl groups;
   B) a fluorinated compound as crosslinking radical initiator;
   C) a fluorinated bis-olefin of structure (I) as cross-linking agent;
      wherein the radical crosslinking is carried out at a temperature in the range of 250° C.–310° C.

2. The process according to claim 1, wherein the fluorinated monomers containing sulphonyl groups —$SO_2F$ are selected from the group consisting of:
   $F_2C=CF-O-CF_2-CF_2-SO_2F$;
   $F_2C=CF-O-(CF_2-CXF-O)_{n'}-CF_2-CF_2-SO_2F$ wherein X=Cl, F or $CF_3$; n'=1–10;
   $F_2C=CF-O-CF_2-CF_2-CF_2-SO_2F$ (vinylsulphonylfluoride);
   $F_2C=CF-Ar-SO_2F$ wherein Ar is an aryl ring.

3. The process according to claim 1, wherein the crosslinkable sulphonic fluorinated ionomers A) comprise:
   from 54% to 71% by moles of monomeric units deriving from TFE;
   from 45% to 28% by moles of monomeric units deriving from vinylsulphonylfluoride $F_2C=CF-O-CF_2-CF_2=SO_2F$;
   an amount higher than 0.4% by moles up to 3% by moles of monomeric units deriving from the bis-olefin of formula (I).

4. The process according to claim 1, wherein the radical initiators B) are selected from the group consisting of:
   (d) branched perfluoralkanes of formula:

$C_aF_{2a+2}$ wherein $a$=5–15;

(e) halogenated compounds of formula:

$ClO_2S(CF_2)_nSO_2Cl$ wherein n=4–10;

(f) peroxidic perfluoropolyether compounds having oxidizing power in the range 0.8–6 of structure T—O—$(R_f)$—$(O)_c$—T'
   wherein:

T,T'=—$CF_3$, —$CF_2CF_3$, —$CF_2CF_2CF_3$ c is an integer such as to give the above oxidizing power;

$R_f$ is a perfluoropolyether chain having a number average molecular weight in the range 1,000 and 30,000, comprising one or more of the following units:

—$(CF_2O)$—, —$(CF_2CF_2O)$—, —$(CF_2CF_2CF_2O)$—, —$(C_3F_6O)$—.

5. The process according to claim 4, wherein the perfluoropolyether chain $R_f$ is selected from the following structures:

—$(CF_2O)_{a'}$, $(CF_2CF_2O)_{b'}$— with b'/a' in the range 0.1–40, a' and b' being integers such as to give the above molecular weight;

—$(CF_2O)_{c'}$, $(C_3F_6O)_{d'}$— with c'/d' in the range 0.01–5, c' and d' being integers such to give the above molecular weight.

6. The process according to claim 4, wherein a radical initiator of formula (f) is used in a concentration in the range 2%-10% by weight, with respect to the weight of the sulphonic ionomer.

7. The process according to claim 1, wherein as crosslinking agent the bis-olefin of formula (I) is used in a concentration in the range of 3%–25% by weight with respect to the weight of the sulphonic ionomer.

8. A process for preparing supported or self-supported membranes comprising utilizing the sulphonic fluorinated ionomers crosslinked according to the process of claim 1 to prepare the supported or self-supported membranes.

9. The process according to claim 8, wherein the support is foamed PTFE.

10. The process according to claim 9, comprising preparing a solution formed by:
    A) a solution of the sulphonic ionomer in a fluorinated solvent selected from the group consisting of: hexafluoroxylene, perfluorohexane, perfluorooctane, perfluorobenzene, perfluoropolyether solvents, fluoroether solvents:
    B) a radical initiator of formula (d), (e) or (f);
       (d) branched perfluoralkanes of formula:

$C_aF_{2a+2}$ wherein a=5–15;

(e) —halogenated compounds of formula:

$ClO_2S(CF_2)_nSO_2Cl$ wherein n=4–10;

(f) —peroxidic perfluoropolyether compounds having oxidizing power in the range 0.8–6 of structure T—O—$(R_f)$—$(O)_c$—T' wherein:

T,T'=—$CF_3$, —$CF_2CF_3$, —$CF_2CF_2CF_3$ c is an integer such as to give the above oxidizing power;

$R_f$ is a perfluoropolyether chain having a number average molecular weight in the range 1,000 and 30,000, comprising one or more of the following units:

—$(CF_2O)$—, —$(CF_2CF_2O)$—, —$(CF_2CF_2CF_2O)$—, —$(C_3F_6O)$—;

C) the bis-olefin of formula (I) as crosslinking agent; and dipping a porous support of foamed PTFE in the solution formed by A)+B)+C) for a time comprises between 10 seconds and 1 minute and repeating the dipping more times; the impregnated membrane being crosslinked at the crosslinking temperature for a reaction time equal to 6 half-lives of the used initiator.

11. The process according to claim 8, comprising casting the membranes from solvent.

12. The process according to claim 8, comprising casting or pressing the membranes.

13. The process according to claim 12, comprising forming a film of the solution:
   A) a solution of the sulphonic ionomer in a fluorinated solvent selected from the group consisting of: hexafluoroxylene, perfluorohexane, perfluorooctane, perfluorobenzene, perfluoropolyether solvents, fluoroether solvents;
   B) a radical initiator of formula (d), (e) or (f):
      (d) branched perfluoralkanes of formula:

$C_aF_{2a+2}$ wherein a=5–15;

(e) halogenated compounds of formula:

$ClO_2S(CF_2)_nSO_2Cl$ wherein n=4–10;

(f) —peroxidic perfluoropolyether compounds having oxidizing power in the range 0.8–6 of structure T—O—($R_f$)—(O)$_c$—T'
      wherein:

T,T'=—CF$_3$, —CF$_2$CF$_3$, —CF$_2$CF$_2$CF$_3$ c is an integer such as to give the above oxidizing power;

$R_f$ is a perfluoropolyether chain having a number average molecular weight in the range 1,000 and 30,000, comprising one or more of the following units:

—(CF$_2$O)—, —(CF$_2$CF$_2$O)—, —(CF$_2$CF$_2$CF$_2$O)—, —(C$_3$F$_6$O)—;

C) the bis-olefin of formula (I) as crosslinking agent;
      and placing the film between two metal plates containing a metal frame; and thereafter putting the plate/frame/film system in a press oven and applying a weight of about 500–2,000 kg.

14. The process according to claim 8, wherein the sulphonyl groups —SO$_2$F are transformed into sulphonic groups —SO$_3$H by 2 steps:
   salification for transforming the —SO$_2$F form into the —SO$_3$K form;
   acidification for transforming the —SO$_3$K form into the —SO$_3$H form.

15. The process according to claim 14, wherein the salification is carried out in a basic aqueous solution of KOH or of NaOH at a temperature in the range 5° C.–40° C. for a time comprises between 4 and 40 hours.

16. The process according to claim 14, wherein the acidification is carried out in an aqueous solution containing the 20% by weight of HCl at 25° C. for 5 hours.

* * * * *